US010051978B2

(12) United States Patent
Gupta et al.

(10) Patent No.: US 10,051,978 B2
(45) Date of Patent: Aug. 21, 2018

(54) PEGBOARD ADAPTER AND METHOD

(71) Applicant: Anil K. Gupta, Pittsburgh, PA (US)

(72) Inventors: Eshan Gupta, Fox Chapel, PA (US);
Anil K. Gupta, Pittsburgh, PA (US)

(73) Assignee: Anil K. Gupta, Pittsburgh, PA (US)

( * ) Notice: Subject to any disclaimer, the term of this patent is extended or adjusted under 35 U.S.C. 154(b) by 0 days.

(21) Appl. No.: 15/336,039

(22) Filed: Oct. 27, 2016

(65) Prior Publication Data
US 2018/0116427 A1    May 3, 2018

(51) Int. Cl.
*A47F 5/08* (2006.01)
*F16M 13/02* (2006.01)
*A47B 96/06* (2006.01)

(52) U.S. Cl.
CPC .......... *A47F 5/0823* (2013.01); *A47B 96/061* (2013.01); *A47B 96/067* (2013.01); *A47F 5/0838* (2013.01); *F16M 13/022* (2013.01); *A47F 5/0815* (2013.01); *A47F 5/0846* (2013.01); *A47F 5/0869* (2013.01)

(58) Field of Classification Search
CPC .... A47F 5/0823; A47F 5/0846; A47F 5/0869; A47F 5/0815; F16M 13/022; F16M 11/041
USPC ............ 248/220.22, 220.31, 220.41, 220.42; 248/220.43, 222.51; 211/57.1, 59.1
See application file for complete search history.

(56) References Cited

U.S. PATENT DOCUMENTS

| 2,614,701 A | * | 10/1952 | Mapson | ................ | A47F 5/0815 |
| | | | | | 211/169 |
| 2,730,243 A | * | 1/1956 | Platt | ..................... | A47F 5/0876 |
| | | | | | 211/59.1 |
| 2,913,210 A | * | 11/1959 | Tichnor | ............... | A47F 5/0823 |
| | | | | | 211/87.01 |
| 2,991,968 A | * | 7/1961 | Lydard | .................. | A47F 5/0823 |
| | | | | | 248/220.42 |
| 3,409,260 A | * | 11/1968 | Bleed | .................... | A47F 5/0823 |
| | | | | | 248/220.22 |
| 3,677,415 A | * | 7/1972 | Radek | .................... | A47F 5/0807 |
| | | | | | 248/220.42 |

(Continued)

OTHER PUBLICATIONS

Long Bracket Non-Patent Literature.

*Primary Examiner* — Stanton L Krycinski
*Assistant Examiner* — Taylor L Morris
(74) *Attorney, Agent, or Firm* — James Ray and Assoc. IP LLC

(57) ABSTRACT

An adapter for attaching a slatwall accessory to a pegboard comprises a first region with an elongated aperture being sized and shaped to receive an offset portion of the slatwall accessory therethrough, two hooks disposed on one edge of the first region and being configured to attach the adapter to the pegboard, a second region extending from the first region in a vertical direction and being offset therefrom in a direction away from the pegboard, during use of the adapter, and a flange terminating the second region and being configured to abut a surface of the pegboard during use of the adapter. The flange can be replaced with a third region to receive another flange of the slatwall accessory and a fourth region to detachably attach a bottom of the adapter to the pegboard. The adapter can be configured as a rail to attach a plurality of the slatwall accessories.

20 Claims, 14 Drawing Sheets

(56) References Cited

U.S. PATENT DOCUMENTS

| | | | | |
|---|---|---|---|---|
| 3,985,324 A | * | 10/1976 | Larson | A47F 5/0823 211/70.6 |
| 4,093,168 A | * | 6/1978 | Buril | A47F 5/0807 211/57.1 |
| 4,113,109 A | * | 9/1978 | Donnelli | A47F 5/0823 206/806 |
| 4,303,217 A | | 12/1981 | Garfinkle | |
| 4,327,888 A | * | 5/1982 | Scheneman | A47F 5/0823 248/220.43 |
| 4,352,478 A | * | 10/1982 | Loew | A47F 5/0853 248/220.31 |
| 4,452,360 A | * | 6/1984 | Barnes | A47F 5/0823 211/59.1 |
| 4,502,602 A | * | 3/1985 | Swanson | A47F 5/0823 211/57.1 |
| 4,509,648 A | * | 4/1985 | Govang | A47F 5/0846 211/59.1 |
| 4,516,681 A | * | 5/1985 | Jahel | A47F 5/0823 211/104 |
| 4,674,721 A | * | 6/1987 | Thalenfeld | A47F 5/0823 211/59.1 |
| 4,688,683 A | * | 8/1987 | Thalenfeld | A47F 5/0823 211/57.1 |
| 4,768,660 A | * | 9/1988 | Handler | B25H 3/04 211/106.01 |
| 4,809,479 A | * | 3/1989 | Tierno | E04F 13/0864 211/189 |
| 4,809,940 A | | 3/1989 | Trestyn | |
| 5,038,946 A | * | 8/1991 | Tenser | A47F 5/04 206/554 |
| 5,109,992 A | * | 5/1992 | Miller | A47F 5/0823 211/59.1 |
| 5,407,160 A | | 4/1995 | Hollingsworth et al. | |
| 5,456,435 A | * | 10/1995 | Sweeney | A47F 57/40 211/90.01 |
| 5,499,723 A | * | 3/1996 | Morrow | A47F 5/0823 211/59.1 |
| 5,881,982 A | | 3/1999 | Hollingsworth et al. | |
| 5,944,294 A | * | 8/1999 | Baer | A47F 5/0846 248/220.43 |
| 6,015,124 A | * | 1/2000 | Loy | A47F 5/0815 248/220.31 |
| 6,454,230 B1 | | 9/2002 | Accuardi | |
| 6,530,486 B1 | * | 3/2003 | Batting | A47F 5/0823 211/57.1 |
| 6,722,619 B2 | | 4/2004 | Valiulis et al. | |
| 7,210,660 B2 | | 5/2007 | James et al. | |
| 7,334,763 B1 | * | 2/2008 | Rice | A47F 5/0823 211/57.1 |
| 7,891,617 B2 | | 2/2011 | Tisbo | |
| D679,172 S | | 4/2013 | Dixon | |
| 2003/0057336 A1 | | 3/2003 | Hochman | |
| 2003/0071181 A1 | * | 4/2003 | Valiulis | A47F 5/0823 248/220.43 |
| 2006/0266901 A1 | * | 11/2006 | Tallman | A47F 5/0846 248/220.43 |
| 2009/0078663 A1 | * | 3/2009 | Gajewski | A47F 5/0823 211/153 |
| 2009/0266953 A1 | | 10/2009 | Goldstein et al. | |
| 2015/0083744 A1 | * | 3/2015 | Vogler | A47F 1/126 221/154 |

* cited by examiner

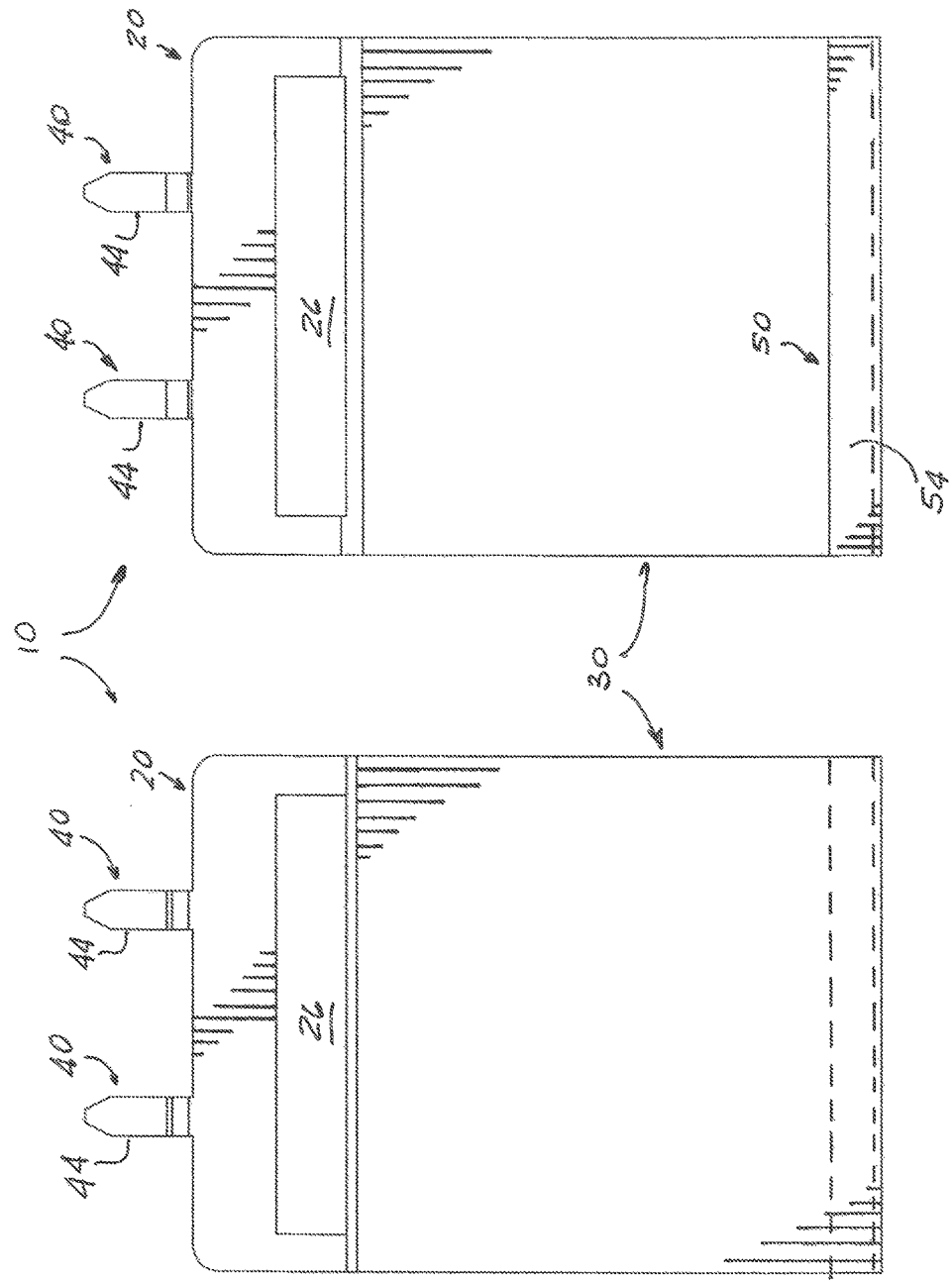

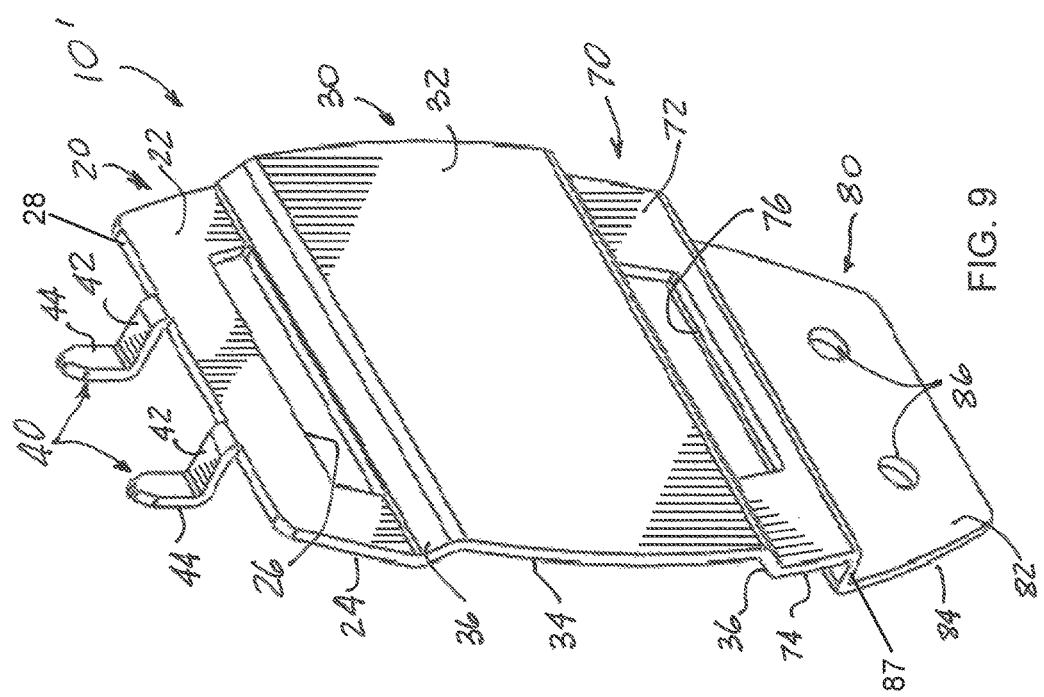

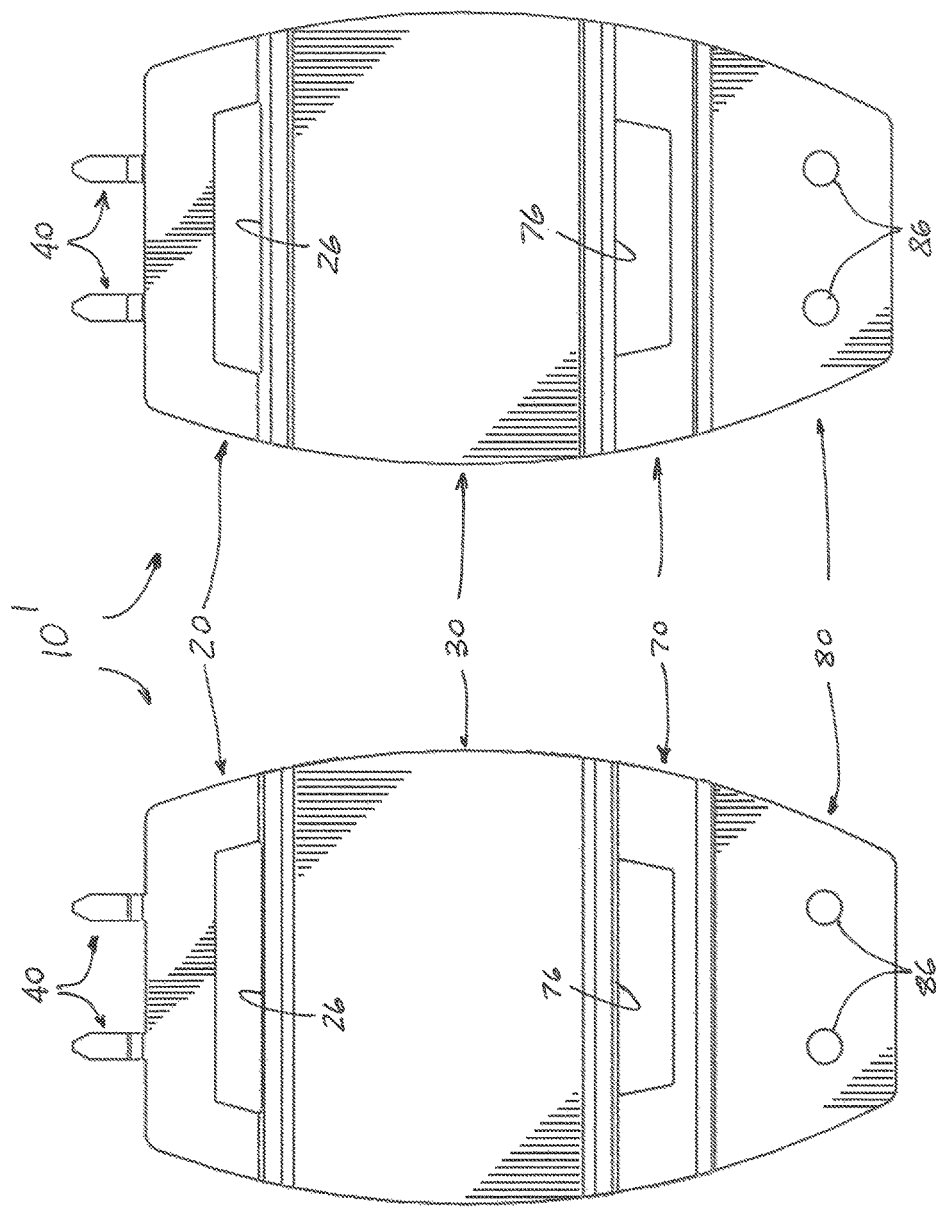

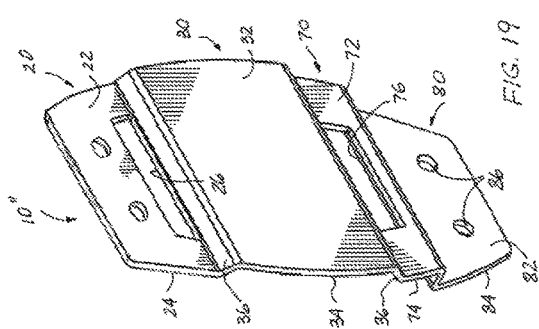
FIG. 19
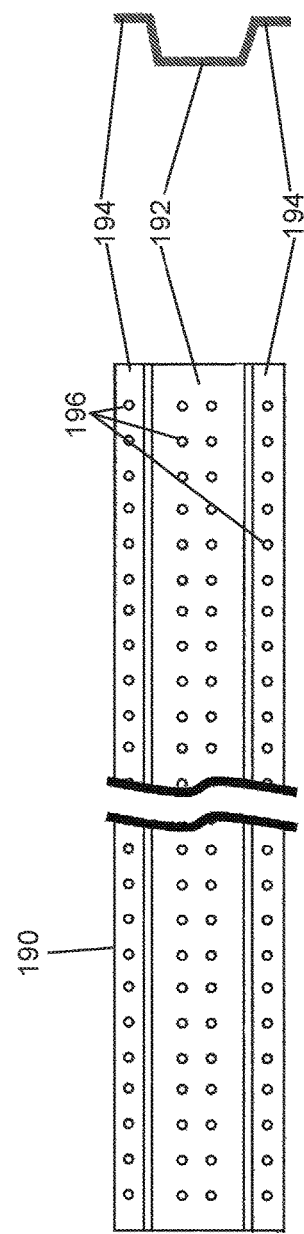
FIG. 20
FIG. 21

PEGBOARD ADAPTER AND METHOD

CROSS-REFERENCE TO RELATED APPLICATIONS

The present application closely relates to co-pending U.S. design patent application Ser. No. 29/582,450 titled "PEGBOARD ADAPTER" and filed concurrently herewith by inventor Eshan Gupta. The present application also closely relates to U.S. design patent application Ser. No. 29/549,671 titled "PEGBOARD ADAPTER" and filed on Dec. 28, 2015 by inventor Anil Gupta. The foregoing references are hereby incorporated herein by reference in their entirety.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND

1. Technical Field

The subject matter relates to storage and/or display of articles. It further relates to an adapter configured to attach slatwall accessories to a pegboard.

2. Description of Related Art

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Generally, perforated support panel (also known as pegboards) and slatwalls (also known as a slotwall) are commonly used for storage and/or display of articles. Pegboard comprises a sheet like material with regularly spaced perforations. Articles are attached through use of hook(s) engaging perforation(s). Slatwall comprises a panel with horizontal grooves that are configured to accept a variety of merchandizing accessories. Generally, merchandizing accessories for the slatwall greatly outnumber merchandizing accessories for the pegboard.

Therefore, there is at least a need to attach slatwall accessories to the pegboard.

BRIEF DESCRIPTION OF THE DRAWINGS

The accompanying drawings are incorporated in and constitute part of the specification and illustrate various embodiments. In the drawings:

FIG. 2 illustrates a front view of the perforated support panel adapter of FIG. 1;

FIG. 3 illustrates a rear view of the perforated support panel adapter in FIG. 1;

FIG. 9 illustrates a 3D view of an exemplary embodiment of a perforated support panel adapter;

FIG. 10 illustrates a front view of the perforated support panel adapter of FIG. 9;

FIG. 11 illustrates a rear view of the perforated support panel adapter in FIG. 9;

FIG. 19 a 3D view of an exemplary embodiment of a perforated support panel adapter;

FIG. 20 is a plan view of an exemplary perforated support panel member that can be used with the perforated support panel adapter of FIGS. 1-19;

FIG. 21 is an end view of the perforated support panel member of FIG. 19.

DETAILED DESCRIPTION OF EXEMPLARY EMBODIMENTS

Figure 1:
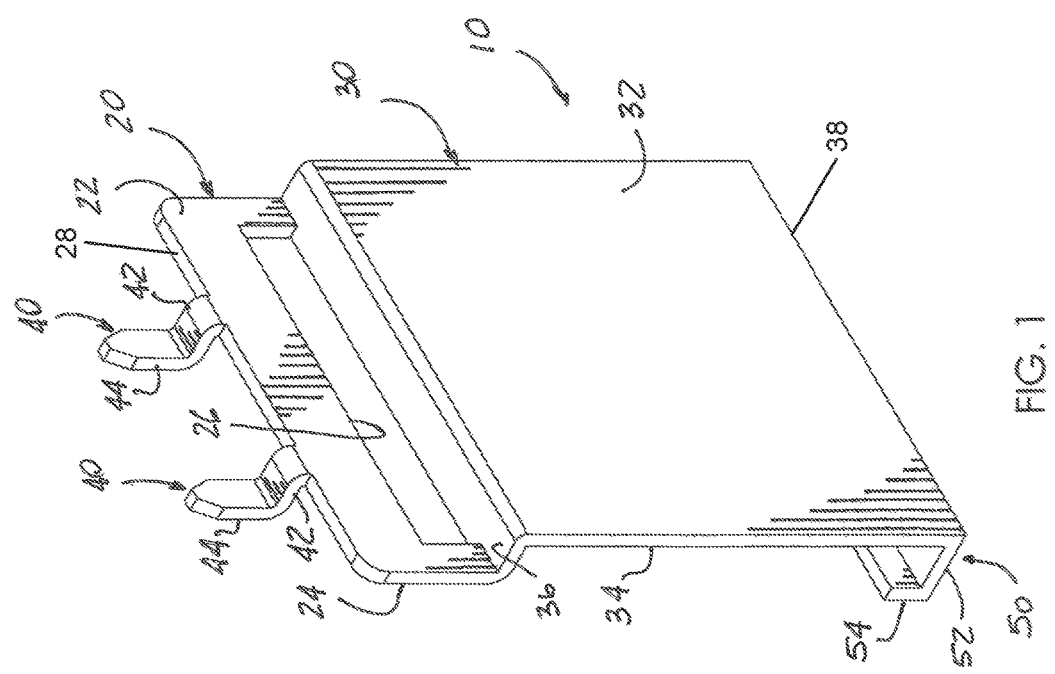
FIG. 1 illustrates a 3D view of one embodiment of a perforated support panel adapter.
Figure 6:
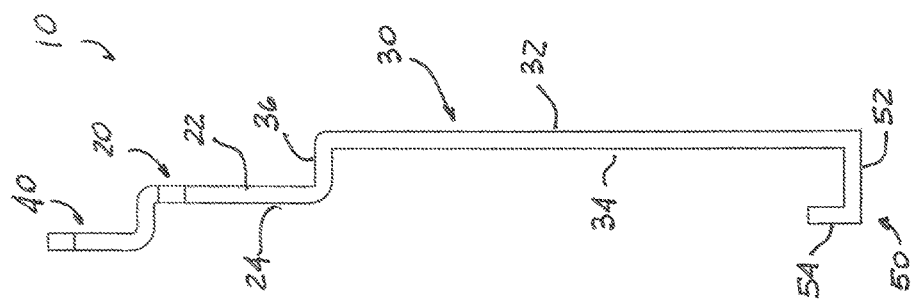
FIG. 6 illustrates a left view of the perforated support panel adapter in FIG. 1.
Figure 4:
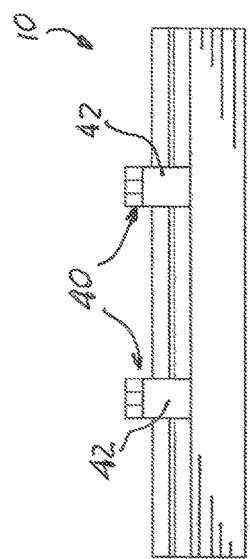
FIG. 4 illustrates a top view of the perforated support panel adapter in FIG. 1.
Figure 5:
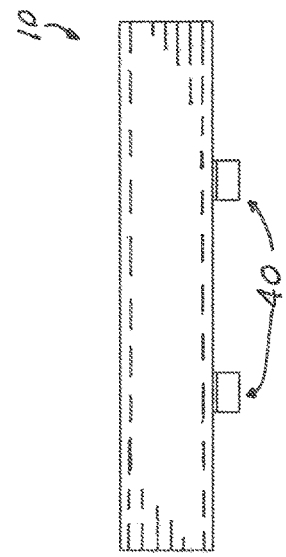
FIG. 5 illustrates a bottom view of the perforated support panel adapter in FIG. 1.

Prior to proceeding to the more detailed description of the present invention, it should be noted that, for the sake of clarity and understanding, identical components which have identical functions have been identified with identical reference numerals throughout the several views illustrated in the drawing figures.

The following detailed description is merely exemplary in nature and is not intended to limit the described examples or the application and uses of the described examples. As used herein, the words "example", "exemplary" or "illustrative" means "serving as an example, instance, or illustration." Any implementation described herein as "example", "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

References in the specification to "one embodiment", "an embodiment", "another embodiment", "a presently preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

For purposes of description herein, the directional and/or relationary terms such as "upper," "top," "lower," "bottom," "left," "right," "rear," "back," "front," "apex," "vertical," "horizontal," "lateral," "exterior," "interior," and derivatives thereof are relative to each other and are dependent on the specific orientation of an applicable element or article, and are used accordingly to aid in the description of the various embodiments and are not necessarily intended to be construed as limiting.

Furthermore, there is no intention to be bound by any expressed or implied theory presented in the preceding technical field, background, or the following detailed description. It is also to be understood that the specific devices and processes illustrated in the attached drawings, and described in the following specification, are simply examples of the inventive concepts defined in the appended claims. Hence, specific dimensions and other physical characteristics relating to the examples disclosed herein are not to be considered as limiting, unless the claims expressly state otherwise.

The term "or" when used in this specification and the appended claims is not meant to be exclusive; rather the term is inclusive, meaning either or both.

As used herein, the term "coupled" includes direct and indirect connections. Moreover, where first and second devices are coupled, intervening devices including active devices may be located there between.

The term "directly coupled" or "coupled directly," when used in this specification and appended claims, refers to a physical connection between identified elements, components, or objects, in which no other element, component, or object resides between those identified as being directly coupled.

The term "operatively coupled," when used in this specification and appended claims, refers to a physical connection between identified elements, components, or objects, wherein operation of one of the identified elements, components, or objects, results in operation of another one of the identified elements, components, or objects.

The terms "removable", "removably coupled", "removably disposed," "readily removable", "readily detachable", "detachably coupled", "separable," "separably coupled," "releaseably attached", "detachably attached" and similar terms, when used in this specification and appended claims, refer to structures that can be uncoupled, detached, uninstalled, or removed from an adjoining structure with relative ease (i.e., non-destructively, and without a complicated or time-consuming process), and that can also be readily reinstalled, reattached, or coupled to the previously adjoining structure.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer, or section without departing from the teachings herein.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The term "non-slatwall member", when used in this specification and appended claims, refers to a support panel void or absent of conventional grooves or slots in a conventional slatwall. Perforated support panel is one of an example of such "non-slatwall member".

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The particular embodiments of the present disclosure generally provide adapters and methods directed to attachment or coupling of one or more slatwall accessories to a perforated support panel. The adapter may be also referred to as a bracket or an article of manufacture. The perforated support panel can be also referred to herein as a support member.

Reference is now made, to FIGS. 1-8, wherein there is shown an exemplary embodiment of an adapter 10 configured to attach or couple a slatwall accessory with a single offset flange to the perforated support panel 2. The perforated support panel 2 comprises a surface 4, which is generally a front surface of the perforated support panel 2 or the surface that faces a user of the adapter 10.

The exemplary adapter 10 comprises a first region 20, a second region 30, two or more hooks 40 and a return flange 50. The first region 20 and a second region 30 can means herein as defining a body of the adapter 10.

The first region 20 can be provided as a flat region with a first surface 22 and a second surface 24 being spaced apart from each other to define thickness of the first region 20. The first region 20 also comprises an elongated aperture 26 formed through a thickness thereof.

The second region 30 can be also provided as a flat region with a first surface 32 and a second surface 30 being spaced apart from each other to define a thickness of the second region 30. The second region 30 is offset from the first region 20 with an offset portion 36. When both the first region 20 and the second region 30 are provided as flat regions, the second region 30 is disposed generally parallel to the first region 20, except for manufacturing tolerances. Although the offset portion 36 has been illustrated as being disposed generally perpendicular to both the first region 20 and the second region 30, such offset region 36 can be disposed at an angle other than ninety degrees to the second region 30. This angle can be smaller or greater than 90 degrees. The side edges of the second region 30 can be partially or fully straight or partially or fully curved. It is not necessary that the second region 30 be solid and voids (not shown) are contemplated, particularly to reduce weight of the adapter 10. The second region 30 defines a portion of the body being disposed at a distance from the surface 4 of the perforated support panel 2.

The two hooks 40 extend from an edge 28 of the first region 20 and generally define an upper end of the adapter 10 during use thereof when the adapter 10 is attached or coupled to the perforated support panel 2. Each hook 40 defines an L-shaped configuration with the first portion 42 and a second portion 44. The second portion 44 is disposed generally parallel to the first region 20, except for manufacturing tolerances. Or, in other words, when the first region 20 is not flat, the second portion 44 is disposed generally vertical during use of the adapter 10. The upper free end of the second portion 44 can be beveled or tapered. The first portion 42 extends from the first region 20 in a direction opposite to the offset portion 36. Although the adapter 10 has been illustrated with two hooks 40, more hooks 40 can be provided.

The return flange 50 extends from a lower edge 38 of the second region 30. In an example, the flange 50 may comprise a first flange portion 52 and a second flange portion 54 defining, in a combination with each other, an L-shaped configuration of the flange 50. The first portion 52 is illustrated as extending generally perpendicular to the second region 30.

In an example, the flange 50 can be only comprised by a first portion 52 extending generally perpendicular to the second region 30.

In an example, the flange 50 can be only comprised by a first portion 52 extending at an angle other than ninety degrees to the second region 30. This angle can be smaller or greater than 90 degrees.

In an example, the flange 50 does not have to extend a full length of width of the second region 30.

Figure 7:
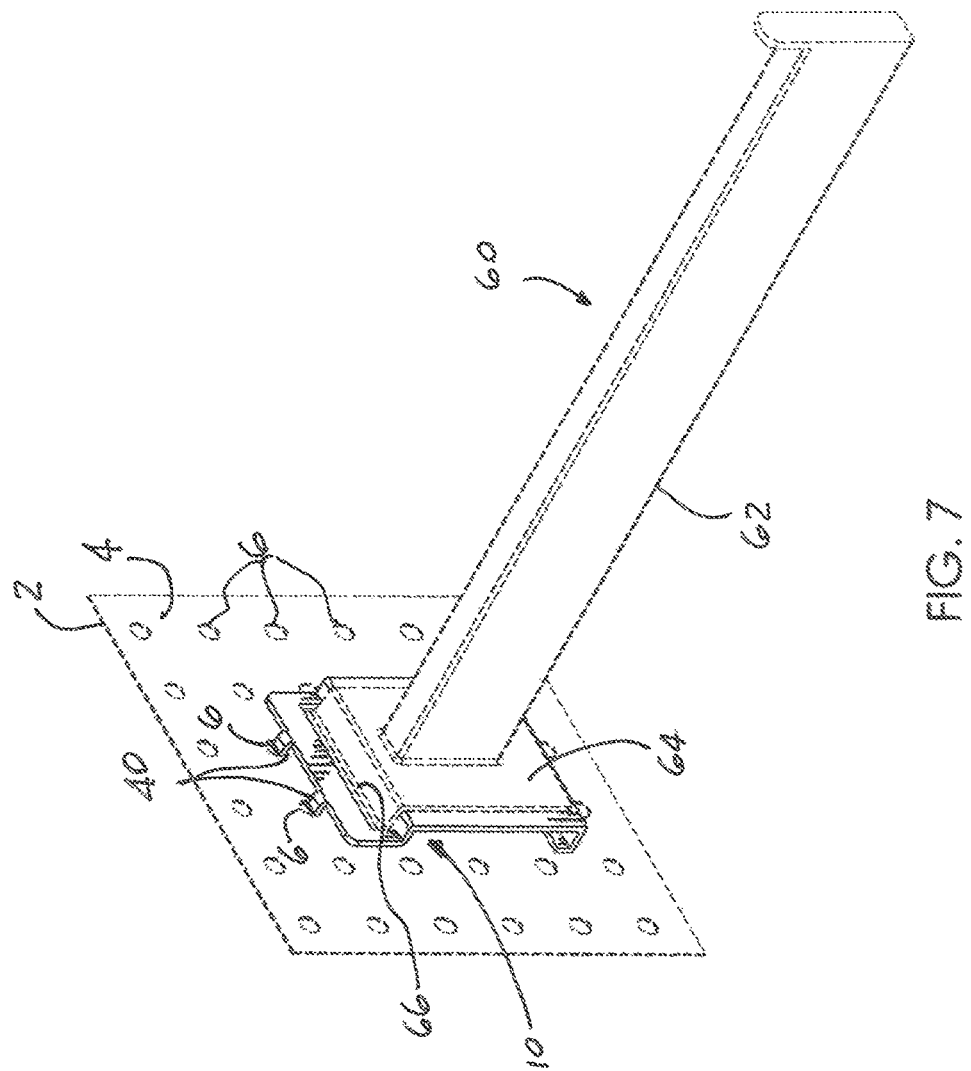
FIG. 7 illustrates one 3D environmental view of the perforated support panel adapter in FIG. 1.
Figure 8:
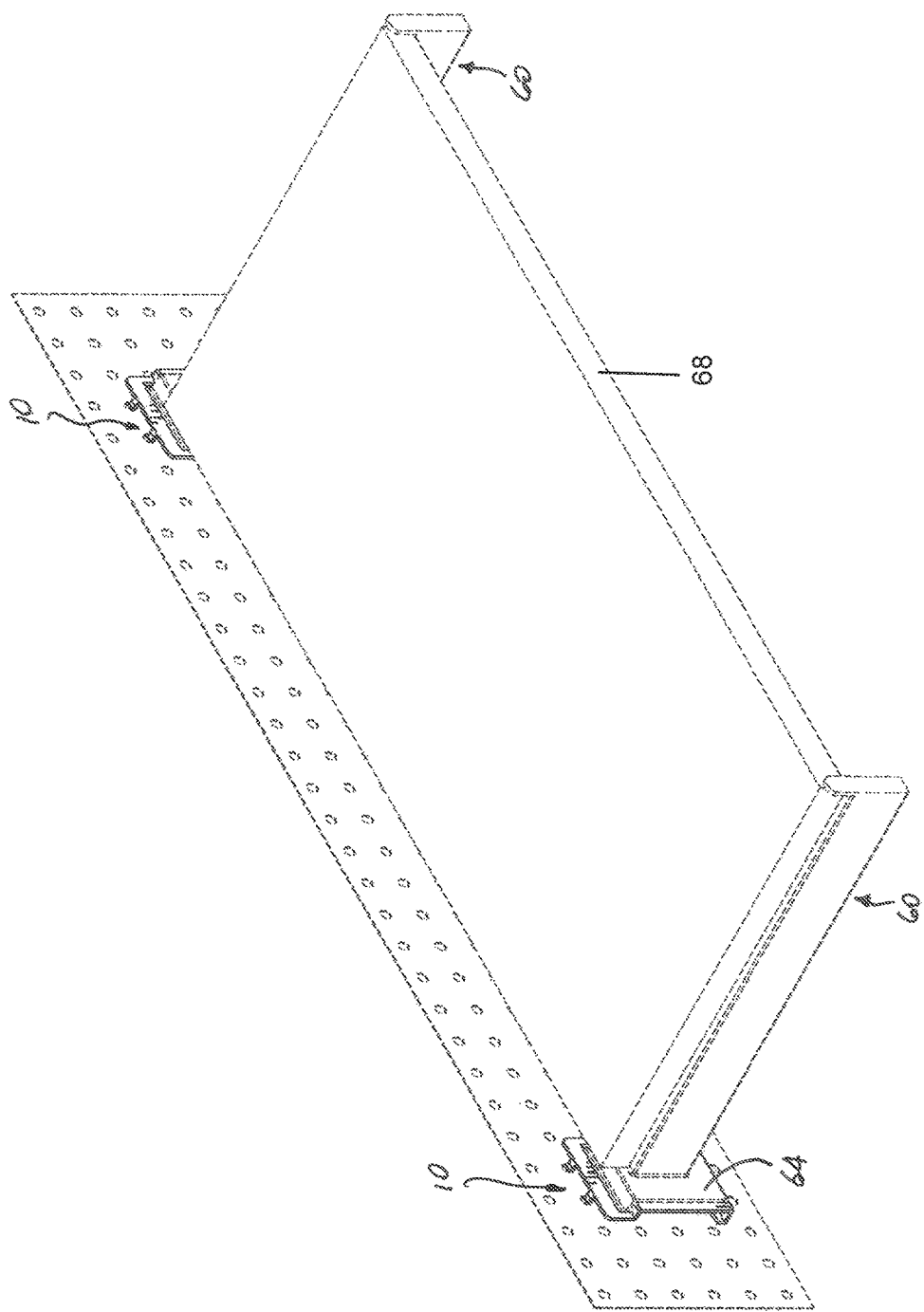
FIG. 8 illustrates another 3D environmental view of the perforated support panel adapter in FIG. 1.
Figure 14:
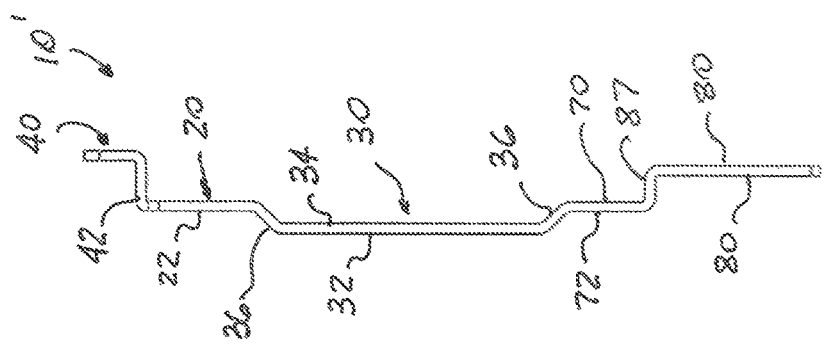
FIG. 14 illustrates a left view of the perforated support panel adapter in FIG. 9.
Figure 12:
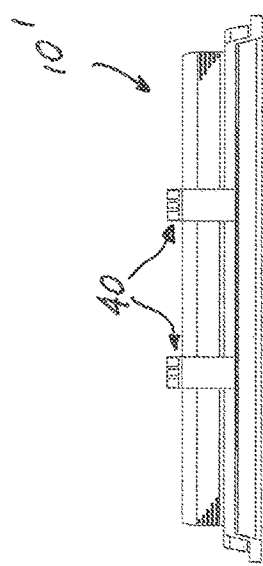
FIG. 12 illustrates a top view of the perforated support panel adapter in FIG. 9.
Figure 13:
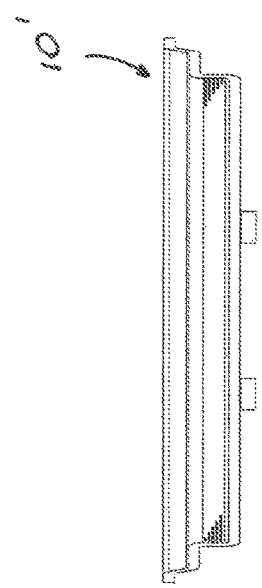
FIG. 13 illustrates a bottom view of the perforated support panel adapter in FIG. 9.

The method of using the exemplary adapter 10 is best illustrated in FIGS. 7-8. FIG. 7 illustrates an exemplary method of using a single adapter 10 in application requiring detachable attachment or detachable coupling of a slatwall accessory with a single offset portion or flange, for example such as elongated support 60 comprising a working portion 62 and an end member 64 with a single offset portion or flange 66, the end member 64 being rigidly attached to one end of the working portion 62.

The second portion 44 of each hook 40 is inserted into a perforation 6 in the perforated support panel 2, with the adapter 10 being at an incline relative to the surface 4 of the perforated support panel 2. The bottom end of the adapter 10 is then allowed to swing toward the surface 4 of the perforated support panel 2 until the return flange 50 abuts such surface 4. The offset portion or flange 66 is then inserted into the elongated aperture 26 and the end member 64 is allowed to pivot toward the second region 30 until the end member 64 rests on the second region 30.

When the slatwall accessory 60 is installed, the portion of the offset 66 is caged between the first region 20 and the surface 4 of the perforated support panel 2. Any weight, for example such as shelf type member 68, placed onto working portion(s) 62 or being suspended from such working portion 62 is counter-reacted by the return flange 50 abutting the surface 4 of the perforated support panel 2. Thus, the working portion 62 remains disposed generally horizontal during use of the adapter 10.

The subject matter also contemplates that the slatwall accessory 60 can be first coupled to the adapter 10, followed by subsequent attachment or coupling of the adapter 10 to the perforated support panel 2. In this exemplary method, the offset portion or flange 66 is first inserted into the elongated aperture 26 in the first region 20. The end member 64 may or may not touch the surface 32 of the second region 30. The second portion 44 of each hook 40 is then inserted into a selected perforation 6 in the perforated support panel 2, with the adapter 10 and the end member 64 being at an incline relative to the surface 4 of the perforated support panel 2. The adapter 20 with the elongated support 60 is then allowed to pivot toward the second region 30 until the end member 64 rests on the second region 30.

FIG. 8 illustrates an exemplary method of using two adapters 10 in application(s) requiring attachment or coupling of slatwall accessories such as shelf type member 68, basket and the like. The method of attaching or coupling the illustrated shelf type member 68 follows an installation of two elongated supports 60 as described above with the shelf type member 68 being placed onto the working portions 62 that are positioned generally horizontally after installation.

The removal, decoupling or detachment, process in any of the above described exemplary methods can be accomplished in reversed steps.

Reference is now made, to FIGS. 9-15, wherein there is shown an exemplary embodiment of an adapter 10' configured to attach or couple slatwall accessory with two offset portions or flanges to the perforated support panel 2.

The adapter 10' comprises a first region 20, a second region 30, two or more hooks 40, a third region 70 extending or modifying the second region 30 and a fourth region 80. The first region 20, a second region 30 and the third region 70 can mean herein as defining a body of the adapter 10'.

The first region 20 can be provided as a flat region with a first surface 22 and a second surface 24 being spaced apart from each other to define thickness of the first region 20. The first region 20 also comprises an elongated aperture 26 formed through a thickness thereof.

The second region 30 can be also provided as a flat region with a first surface 32 and a second surface 30 being spaced apart from each other to define thickness of the second region 30. The second region 30 is offset from the first region 20 with an offset portion 36. When both the first region 20 and the second region 30 are provided as flat regions, the second region 30 is disposed generally parallel to the first region 20, except for manufacturing tolerances. Although the offset region 36 has been illustrated as being disposed generally perpendicular to both the first region 20 and the second region 30, such offset region 36 can be disposed at an angle other than ninety degrees to the second region 30. This angle can be smaller or greater than 90 degrees. The side edges of the second region 30 can be partially or fully curved. The second region 30 defines a portion of the body being disposed at a distance from the surface 4 of the perforated support panel 2.

The two hooks 40 extend from an edge 28 of the first region 20 and generally define an upper end of the adapter 10 during use thereof when attached or coupled to the perforated support panel. Each hook 40 defines an L-shaped configuration with the first portion 42 and a second portion 44. The second portion 44 is disposed generally parallel to the first region 20, except for manufacturing tolerances. Or, in other words, when the first region 20 is not flat, the second portion 44 is disposed generally vertical during use of the adapter 10. The first portion 42 extends from the first region 20 in a direction opposite to the offset region 36. Although the adapter 10' has been illustrated with two hooks 40, more than two hooks 40 can be provided.

The third region 70 can be also provided as a flat region with a first surface 72 and a second surface 74 being spaced apart from each other to define a thickness of the third region 70. The third region 70 also comprises the elongated aperture 76 formed through a thickness thereof and being spaced apart from the elongated aperture 26 in a vertical direction. Thus, the elongated aperture 26 is disposed, during use of the adapter 10' as an upper aperture and the elongated aperture 76 is disposed as a lower aperture. The elongated aperture 76 can be identical to the above described elongated aperture 26. The elongated aperture 76 can be sized greater in a vertical direction then the elongated aperture 26. The third region 70 is offset from a bottom edge of the second region 30 with the offset region 36 or similar offset region. The third region 70 may be also considered as an extension of the second region 30. The second region 30 also defines a portion of the body being disposed at a distance from the surface 4 of the perforated support panel 2.

The fourth region 80 can be also provided as a flat region with a first surface 82 and a second surface 84 being spaced apart from each other to define a thickness of the fourth region 80. The fourth region 80 is adapted with one or more apertures 86 formed through a thickness thereof. Adapter 10' also comprises an offset 87 between the third region 70 and the fourth region 80.

Figure 15:
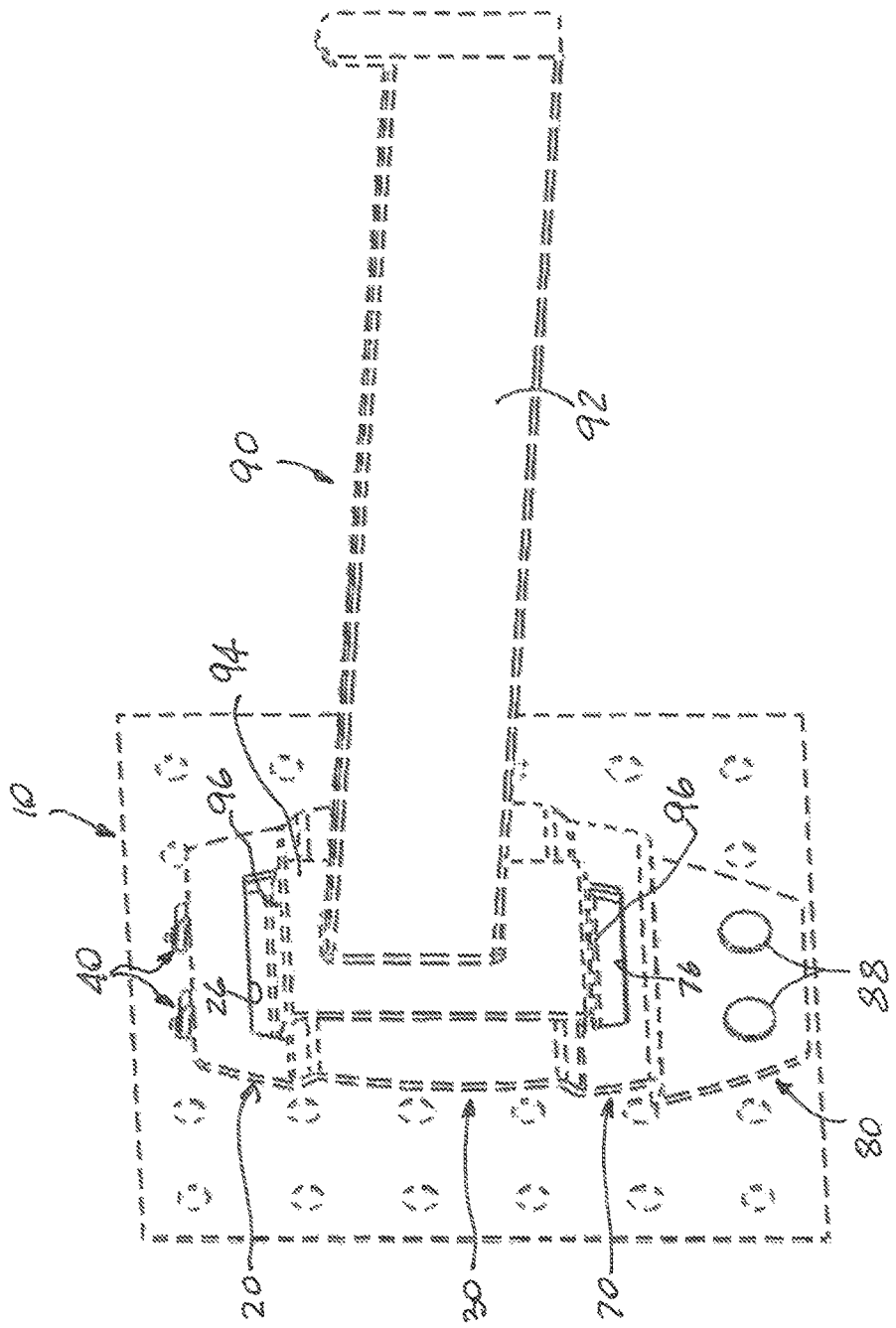
FIG. 15 illustrates a 3D environmental view of the perforated support panel adapter in FIG. 9.

FIG. 15 illustrates an exemplary method of using a single adapter 10' in application requiring attachment or coupling of a single slatwall accessory, for example such as elongated support 90 comprising a working portion 92 and an end member 94 with a pair of offset portions or flanges 96, the end member 94 being rigidly attached to one end of the working portion 92.

The second portion 44 of each hook 40 is inserted into a perforation 6 in the perforated support panel 2, with the adapter 10' being at an incline relative to the surface 4 of the perforated support panel 2. The bottom end of the adapter 10' is then allowed to swing toward the surface 4 of the perforated support panel 2 until the surface 82 of the fourth region 84 abuts such surface 4. Optional fasteners 88 can be then manually inserted through aligned apertures 86 and perforations 6. The upper offset portion or flange 96 is then inserted into the elongated aperture 26 and the end member 94 may be moved upwardly and then allowed to pivot toward the second region 30 so as to insert the lower offset portion or flange 96 into the elongated aperture 76. When the lower offset portion or flange 96 is inserted into the elongated aperture 76, the end member 94 is allowed to shift downwardly.

The removal, detachment or decoupling process can be accomplished in reversed steps.

When the slatwall accessory 90 is installed, the portion of each offset 96 is caged between the first region 20 and the surface 4 of the perforated support panel 2. Any weight, for example such as shelf type member 68, that can be placed onto working portion(s) 92 or being suspended from such working portion 92, is counter-reacted by the third portion 70 and the fourth portion 80 abutting the surface 4 of the perforated support panel 2. Thus, the working portion 92 remains disposed generally horizontal during use of the adapter 10'.

The optional fasteners 88 passing through aligned apertures 86 and perforations 4 at least restrict if not completely eliminate rotation of the adapter 10' where the fourth portion 80 moves away from the direct contact with the surface 4 of the perforated support panel 2. The optional fasteners 88, when used, can also detachably couple or attach the adapter 10' and the slatwall accessory 90 to the perforated support panel 2. The optional fasteners 88 enable installation or removal process without use of any tools, even the one as a screwdriver.

The subject matter also contemplates that the slatwall accessory 90 can be first coupled to the adapter 10', followed by subsequent attachment or coupling of the adapter 10' to the perforated support panel 2.

It is also contemplated that the fourth region 80 can be replaced by the above described flange 50. Likewise, the above described third region 70 and the fourth region 80 can replace the flange 50 in the embodiment of the adapter 10 of FIGS. 1-8.

It would be understood that the flange 50 or the fourth region 80 being configured as a region to prevent tilting of the slatwall accessory support, and even the slatwall accessory, downwardly from a generally horizontal plane, except for some variation due to manufacturing tolerances. It would be also understood that the flange 50 or the fourth region 80 provide means for preventing tilting of the slatwall accessory support, and even the slatwall accessory, downwardly from a generally horizontal plane, except for some variation due to manufacturing tolerances The fastener 88 can be any fastener useable with the perforated support panel 2. For example, such fastener 88 can be a manually installed snap rivet.

When two adapters 10' are required, they can be installed similar to the installation of adapters 10 in FIG. 8.

The adapter 10, 10' can be manufactured by a variety of methods. In an example, the adapter 10, 10' can be manufactured from or comprise a sheet stock with apertures 26, 76 and 86 either punched or laser cut. In an example, the adapter 10, 10' can be manufactured by a casting or a molding process. In an example, the adapter 10, 10' can be manufactured from am extrusion profile with apertures 26, 76 and 86, hooks 40 and curved edges (as applicable) being machined. In an example, the adapter 10, 10' cam be manufactured by a stamping method.

Accordingly, the adapter 10, 10' can comprise a variety of materials, including without limitations, metals, engineered plastics, carbon fiber and combinations thereof. When the adapter 10, 10' comprises metal, the metal can comprise steel, stainless steel, aluminum, titanium, alloys and any combinations thereof. When the adapter 10, 10' comprises engineered plastics (thermoplastics), it can at least comprise any one of ultra high molecular weight polyethylene, polycarbonates, and acrylonitrile butadine styrene (ABS).

Figure 16:
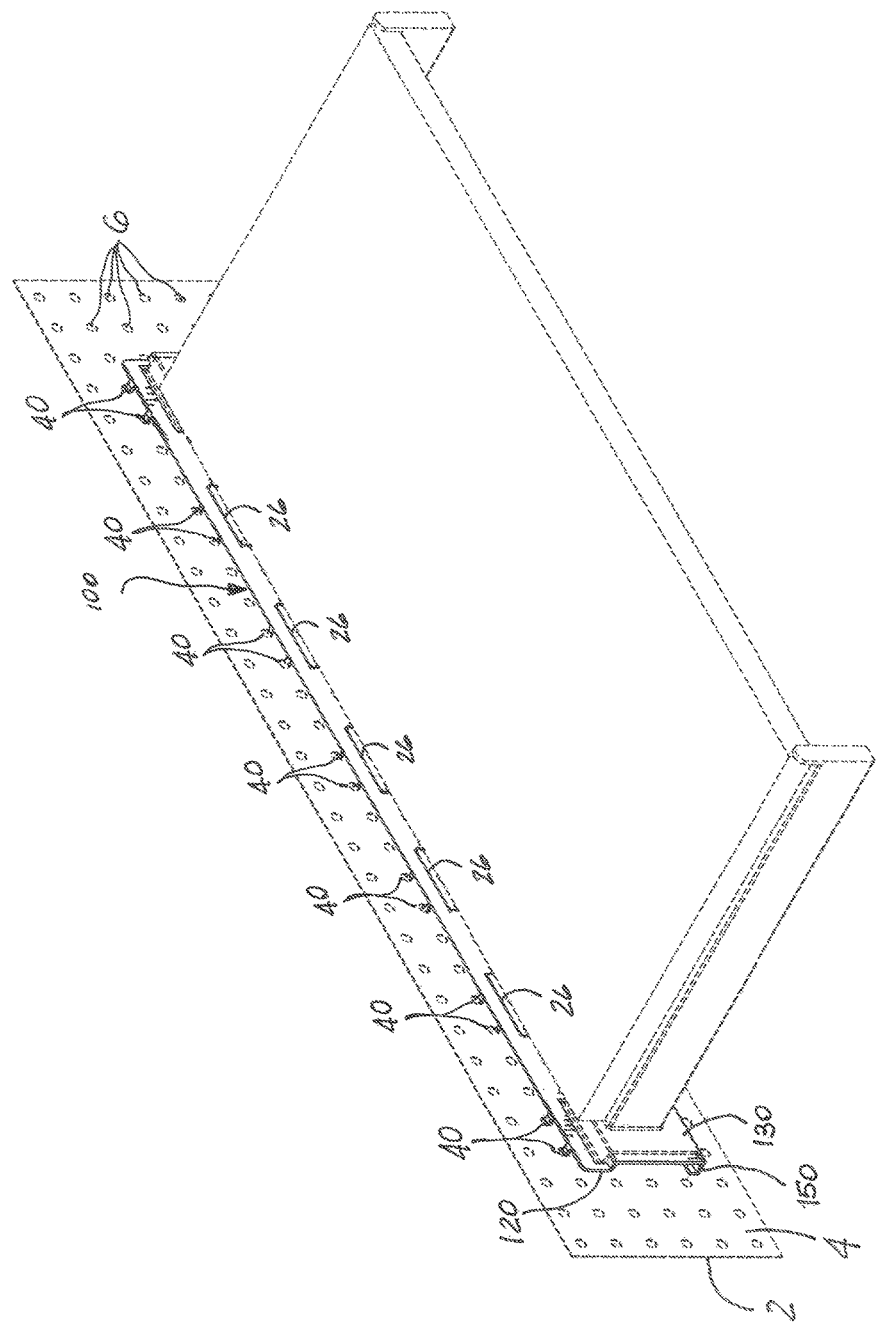
FIG. 16 a 3D view of an exemplary embodiment of a perforated support panel adapter.

In an embodiment of FIG. 16, either adapter 10 or 10' (shown as adapter 10) can be configured as an elongated adapter or rail 100 with a first region 120, a second region 130, a flange 150, a plurality of elongated apertures 26, 86 and with two or more hooks 40. In this embodiment, more than two slatwall accessories 60, 90 can be attached or coupled, in a spaced apart relationship with each other to the adapter 10 or 10'.

Figure 17:
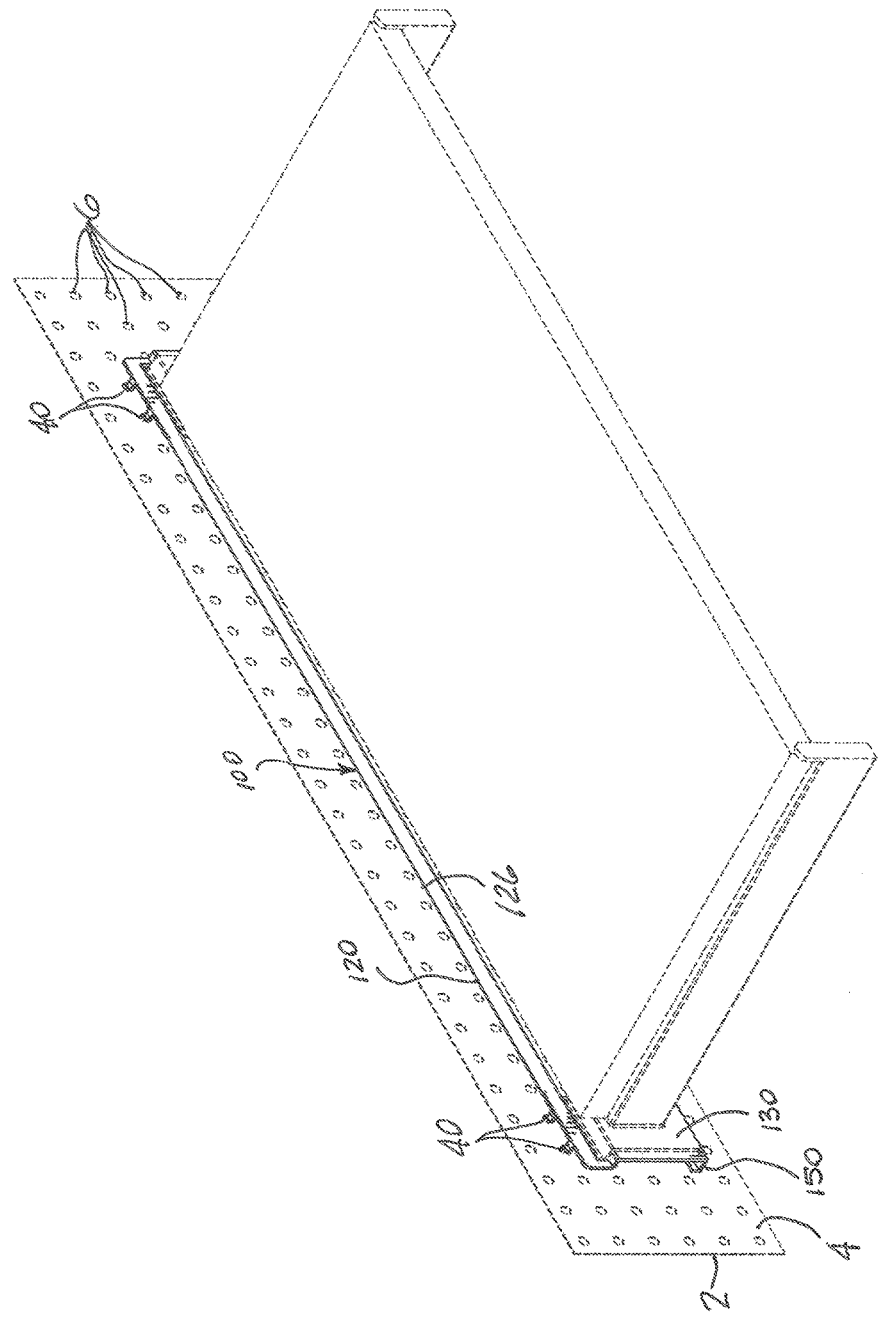
FIG. 17 a 3D view of an exemplary embodiment of a perforated support panel adapter.

In an embodiment of FIG. 17, the adapter 10 can be configured as an elongated adapter or rail 100 with a first region 120, a second region 130, a flange 150, hooks 40, and a single elongated aperture 126 that essentially spans the length of such adapter 100.

Figure 18:
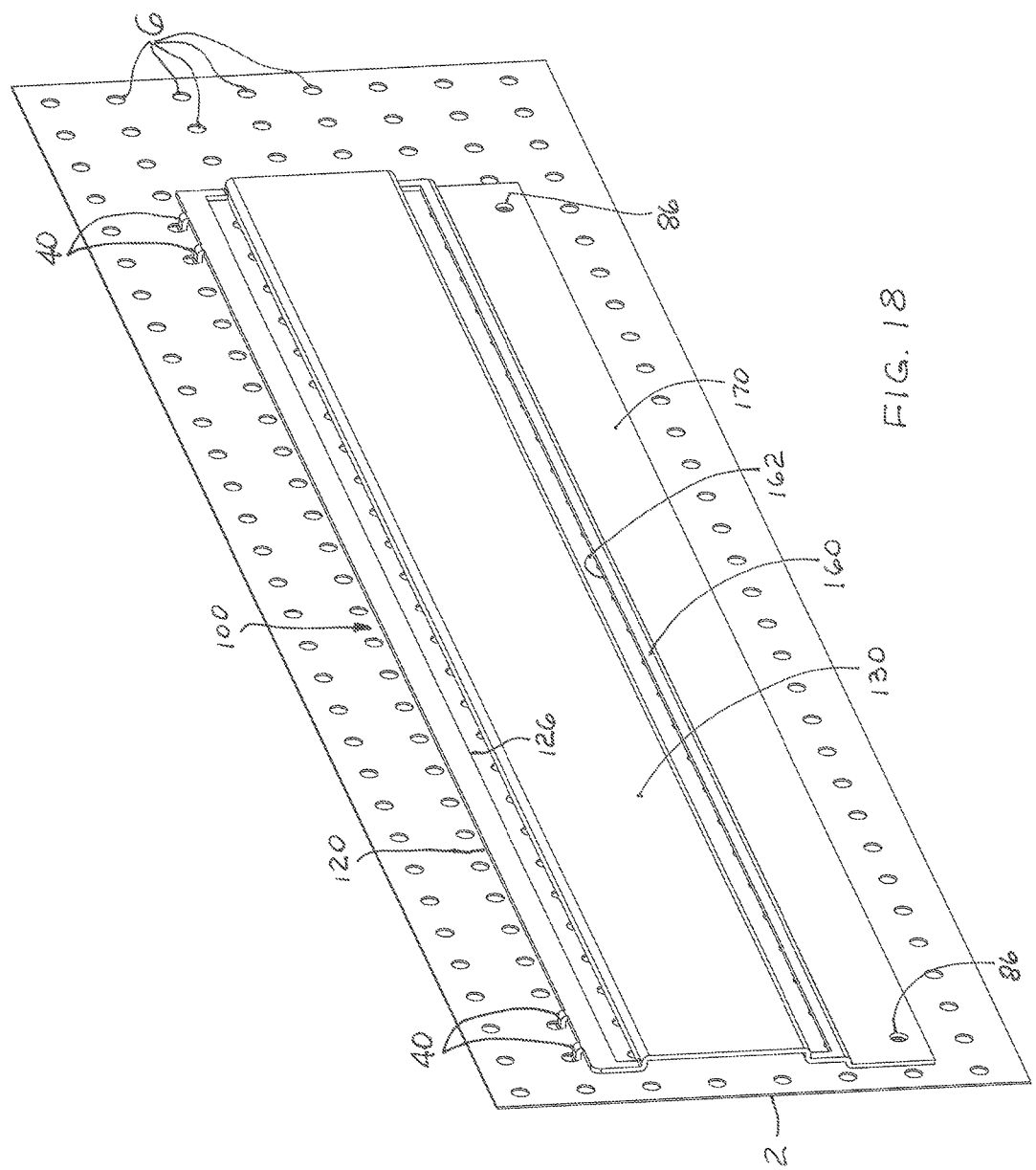
FIG. 18 a 3D view of an exemplary embodiment of a perforated support panel adapter.

In an embodiment of FIG. 18, an adaptation of adapter 10' in a rail configuration or adapter 100 comprises a third region 160, a fourth region 170 and another elongated aperture 162 formed through a thickness of the third region 160. One or more optional apertures 86 can be formed through a thickness of the fourth region 170 in an alignment with the perforation 6, when the adapter 100 is attached or coupled to the perforated support panel 2. As it has been described above, plurality of elongated apertures 26 can replace the single elongated aperture 126 and a plurality of elongated apertures 76 can replace the single elongated aperture 162. Although the embodiment of FIG. 18 illustrates four hooks 40, less or more hooks 40 can be provided, with two hooks 40 being a minimum.

In this embodiment, more than two slatwall accessories 60, can be attached or coupled to the adapter 10 or 10' and positioned at any distance from each other.

In an embodiment of FIG. 19, the above described adapter 10' can be configured as an adapter 10". In this configuration, the first region 20 can be enlarged and the hooks 40 are being replaced with one or more apertures 86, shown as a pair of apertures 86. The adapter 10" can be attached with any conventional fasteners, for example such as the above described fasteners 88. The adapter 10" can be directly attached or coupled to a surface or structure being other than the perforated support panel or perforated member. In an example, the adapter 10" can be at least temporarily attached with threaded or piercing type fasteners to a stationary rigid wall of a dwelling.

It is to be understood that the aperture(s) 86 in the first region 20 can replace the hooks 40 in any embodiment illustrated in FIGS. 1-18. Thus the method of detachably attaching or detachably coupling one or more slatwall accessories can also comprise fastening the adapter with fasteners. Fastening can be achieved with or without using hooks.

Any of the described updaters 10, 10',10", and 100 can be adapted with integrated fasteners or integrated fastener provisions replacing the hooks 40 and/or the apertures 86. These integrated fasteners or integrated fastener provisions can be of the types as disclosed in U.S. Pat. No. 5,407,160 issued on Apr. 18, 1995 and U.S. Pat. No. 5,881,982 issued on Mar. 16, 1992, both to Hollingsworth et al., and whose teachings are incorporated by reference herewithin.

The hooks 40, apertures 86 and (incorporated by reference) integrated fasteners or integrated fastener provisions provide means on a body of the adapter for attaching or coupling the adapter to a perforated support panel or other structure or surface. Furthermore, the hooks 40, apertures 86 and (incorporated by reference) integrated fasteners or integrated fastener provisions provide means on a body of the adapter for attaching or coupling the slatwall accessory to a non-slatwall member.

Figure 22:
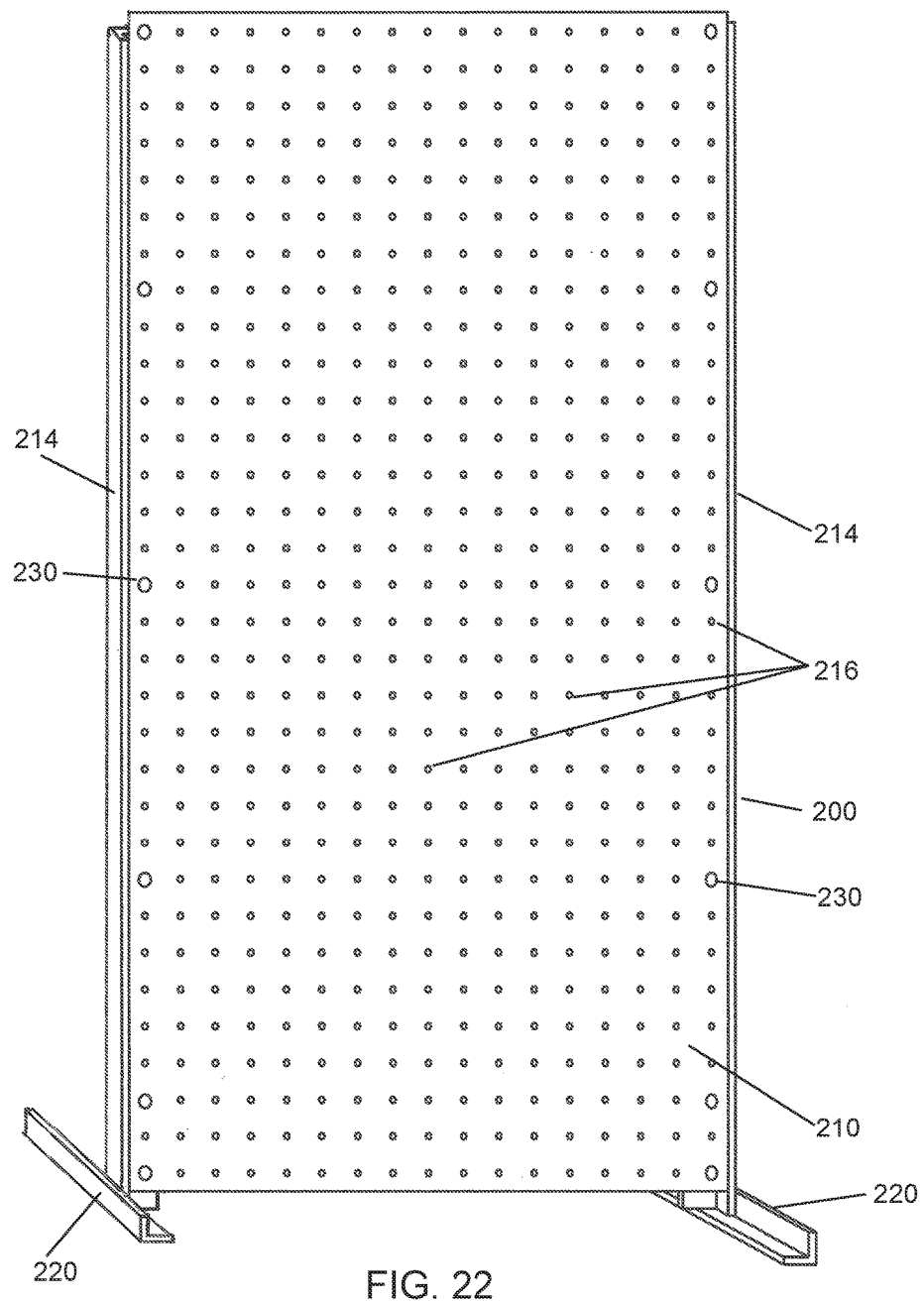
FIG. 22 is a 3D view of an exemplary perforated support panel member that can be used with the perforated support panel adapter of FIGS. 1-19.

The perforated support panel 2, when used, with any of the above described embodiments can be provided in different configurations. In an example, the perforated support panel 2 can be provided as a conventional perforated material being affixed to a vertical wall, for example such as a wall of a dwelling. In an example, the perforated support panel 2 can be attached to a surface in a storage cabinet or a surface on a workbench. In an example of FIGS. 20-21, the perforated support panel can be provided as a rail 190 with a working portion 192 and a pair of mounting portions 194. The rail 190 also comprises perforations 196 to affix the rail to a surface and to attach or couple the adapter onto the working portion 192. In an example, the rail 190 can be of the type as disclosed in U.S. Pat. No. 7,210,660 issued to James et al. on May 1, 2007 and whose teachings are incorporated by reference thereto. In an example of FIG. 22, the perforated support panel 2 can be provided as a perforated component 210 of a free-standing member 200. In this example, the perforated component 200 is adapted with perforations 216 and is fastened with fasteners 230 to a pair of uprights 214, each shown as being supported on a support 220.

One or more adapters 10, 10',10", and 100 can be provided together with the slatwall accessory, for example such as above described accessories 60, 90, as a kit or can be provided independently.

Furthermore, the perforated support panel of any of the described examples, can be provided, as a kit, in a combination with one or more adapters 10, 10', 10", and 100 and one or more slatwall accessories, for example such as the above described accessories 60, 68 and 90.

Any of the described adapters 10, 10', 10", and 100 allows increase in the number of accessories that can be attached or coupled to a perforated support panel or any other perforated component.

Further in this document, each of the appended independent claims or a subject matter claimable in an independent form becomes restated as an Embodiment A, Embodiment B, . . . ; and each of the dependent claims or a subject matter claimable in a dependent form becomes a Feature 1, Feature 2, . . . . Each of the foregoing embodiments A through L may be employed alone or in any combination, and may include any one or more of the following features in any suitable combination. Additional embodiment(s) and/or feature(s) can be also contained in this document.

Embodiment A

An article of manufacture for attaching a slatwall accessory to a perforated support panel, comprising:

a first region comprising an elongated aperture, the elongated aperture sized and shaped to receive an offset portion of the slatwall accessory therethrough;

two hooks disposed on one edge of the first region, each of the two hooks is configured to attach the article of manufacture to the perforated support panel and suspend the article of manufacture therefrom;

a second region extending from the first region in a vertical direction, during use of the article of manufacture, opposite to a direction of the two hooks, a plane of the second region being offset from a plane of the first region in a direction away from a surface of the perforated support panel during use of the article of manufacture; and a flange terminating the second region and being configured to abut the surface of the perforated support panel during use of the article of manufacture.

Embodiment B

An article of manufacture for attaching a slatwall accessory to a perforated support panel, comprising:

a first region comprising an elongated aperture, the elongated aperture sized and shaped to receive an offset portion of the slatwall accessory therethrough;

two hooks disposed on one edge of the first region, each of the two hooks is configured to attach the article of manufacture to the perforated support panel and suspend the article of manufacture therefrom;

a second region extending from the first region in a vertical direction, during use of the article of manufacture, opposite to a direction of the two hooks, a plane of the second region being offset from a plane of the first region in a direction away from the perforated support panel during use of the article of manufacture;

a third region extending from the second region, a plane of the third region being offset from the plane of the second region in a direction of the first region, the third region comprising another elongated aperture being sized and shaped to receive another offset portion of the slatwall accessory therethrough; and a fourth region, extending from the third region, a plane of the fourth region being offset from the plane of the third region in the direction of the first region, the fourth region comprising one or more apertures.

Embodiment C

An article of manufacture for attaching a slatwall accessory to a perforated support panel, comprising:

a first region;

a plurality of elongated apertures, each of the plurality of the elongated apertures being sized and shaped to receive an offset portion of the slatwall accessory therethrough;

two or more hooks disposed on one edge of the first region, each of the two or more hooks is being configured to attach the article of manufacture to the perforated support panel and suspend the article of manufacture therefrom;

a second region extending from the first region in a vertical direction, during use of the article of manufacture, opposite to a direction of the two or more hooks, a plane of the second region being offset from a plane of the first region in a direction away from the perforated support panel during use of the article of manufacture; and a flange terminating the second region and being configured to abut a surface of the perforated support panel during use of the article of manufacture.

Embodiment D

An article of manufacture for attaching a slatwall accessory to a perforated support panel, comprising:

a first region comprising;

a first plurality of elongated apertures disposed in series with each other along a length of the article of manufacture, each of the first plurality of the elongated apertures being sized and shaped to receive an offset portion of the slatwall accessory therethrough;

two or more hooks disposed on one edge of the first region, each of the two or more hooks is being configured to attach the article of manufacture to the perforated support panel and suspend the article of manufacture therefrom;

a second region extending from the first region in a vertical direction, during use of the article of manufacture, opposite to a direction of the two hooks, a plane of the second region being offset from a plane of the first region in a direction away from the perforated support panel during use of the article of manufacture;

a third region extending from the second region, a plane of the third region being offset from the plane of the second region in a direction of the first region, a second plurality of elongated apertures disposed in series with each other along a length of the article of manufacture, each of the second plurality of the elongated apertures being sized and shaped to receive another offset portion of the slatwall accessory therethrough; and a fourth region, extending from the third region, a plane of the fourth region being offset from the plane of the third region in the direction of the first region, the fourth region comprising one or more apertures.

Embodiment E

An article of manufacture for attaching a slatwall accessory to a perforated support panel, comprising:

a first region comprising;

a first plurality of elongated apertures disposed in series with each other along a length of the article of manufacture, each of the first plurality of the elongated apertures being sized and shaped to receive an offset portion of the slatwall accessory therethrough;

two or more hooks disposed on one edge of the first region, each of the two or more hooks is being configured to attach the article of manufacture to the perforated support panel and suspend the article of manufacture therefrom;

a second region extending from the first region in a vertical direction, during use of the article of manufacture, opposite to a direction of the two hooks, a plane of the second region being offset from a plane of the first region in a direction away from the perforated support panel during use of the article of manufacture;

a third region extending from the second region, a plane of the third region being offset from the plane of the second region in a direction of the first region, a second plurality of elongated apertures disposed in series with each other along a length of the article of manufacture, each of the second plurality of the elongated apertures being sized and shaped to receive another offset portion of the slatwall accessory therethrough; and a fourth region, extending from the third region, a plane of the fourth region being offset from the plane of the third region in the direction of the first region, the fourth region comprising one or more apertures.

Embodiment F

A method of attaching a slatwall accessory to a non-slatwall member, comprising:

providing an adapter configured for attachment to the perforated support panel and comprising an elongated aperture;

attaching the adapter to the perforated support panel;

inserting an offset portion of the slatwall accessory into and through the elongated aperture; and rotating the slatwall accessory to abut a surface of the second region.

Embodiment G

A method of attaching a slatwall accessory to a non-slatwall member, comprising:

providing an adapter configured for attachment to the perforated support panel and comprising a pair of elongated apertures separated by a distance in vertical direction during use of the adapter and one or more round apertures;

attaching the adapter to the perforated support panel;

inserting one offset portion of the slatwall accessory into and through an upper elongated aperture;

rotating the slatwall accessory downwardly toward the second region;

inserting another offset portion of the slatwall accessory into and through a lower elongated aperture; and detachably attaching a bottom region of the adapter with one or more fasteners to the non-slatwall member, each of the one or more fasteners being passed through each round aperture being aligned with a perforation in the non-slatwall member.

Embodiment H

An article of manufacture for attaching a slatwall accessory to a non-slatwall member, comprising:

a body comprising a portion being disposed at a distance from a surface of the non-slatwall member;

means for attaching the article of manufacture to the non-slatwall member;

one or more elongated apertures formed through a thickness of the body; and means for preventing tilting of the slatwall accessory downwardly from a generally horizontal plane when the slatwall Embodiment I An article of manufacture for attaching a slatwall accessory to a perforated support panel, comprising:

a first region;

a plurality of elongated apertures, each of the plurality of the elongated apertures being sized and shaped to receive an offset portion of the slatwall accessory therethrough;

two or more hooks disposed on one edge of the first region, each of the two or more hooks is being configured to attach the article of manufacture to the perforated support panel and suspend the article of manufacture therefrom;

a planar second region extending from the first region in a vertical direction, during use of the article of manufacture, opposite to a direction of the two or more hooks, a plane of the second region being offset from a plane of the first region in a direction away from the perforated support panel during use of the article of manufacture; and a flange terminating the second region and being configured to abut a surface of the perforated support panel during use of the article of manufacture.

Embodiment J

An article of manufacture for attaching a slatwall accessory to a perforated support panel, comprising:

a planar first region comprising;

a first plurality of elongated apertures disposed in series with each other along a length of the article of manufacture, each of the first plurality of the elongated apertures being sized and shaped to receive an offset portion of the slatwall accessory therethrough;

two or more hooks disposed on one edge of the first region, each of the two or more hooks is being configured to attach the article of manufacture to the perforated support panel and suspend the article of manufacture therefrom;

a planar second region extending from the first region in a vertical direction, during use of the article of manufacture, opposite to a direction of the two hooks, a plane of the second region being offset from a plane of the first region in a direction away from the perforated support panel during use of the article of manufacture;

a planar third region extending from the second region, a plane of the third region being offset from the plane of the second region in a direction of the first region, a second plurality of elongated apertures disposed in series with each other along a length of the article of manufacture, each of the second plurality of the elongated apertures being sized and shaped to receive another offset portion of the slatwall accessory therethrough; and a planar fourth region, extending from the third region, a plane of the fourth region being offset from the plane of the third region in the direction of the first region, the fourth region comprising one or more apertures.

Embodiment K

A kit or a system comprising:

a perforated support panel member; and one or more adapters configured to attach one or more slatwall accessories to the perforated support panel.

Embodiment L

A kit or a system comprising a perforated support panel member;

one or more slatwall accessories; and one or more adapters configured to attach the one or more slatwall accessories to the perforated support panel.

Feature 1

The body comprises:

a planar first region; and a planar second region extending from the first region in a vertical direction during use of the article of manufacture, a plane of the second region being offset from a plane of the first region, the second region defining the portion of the body being disposed at a distance from the surface of the non-slatwall member.

Feature 2

One or more elongated apertures comprises an elongated aperture formed through a thickness of the first region, the elongated aperture being sized and shaped to receive an offset portion of the slatwall accessory therethrough.

Feature 3

The non-slatwall member is a perforated support panel, the means for attaching the article of manufacture to the non-slatwall member comprises two hooks disposed on one edge of the first region, each of the two hooks is configured to attach the article of manufacture to the perforated support panel and suspend the article of manufacture therefrom.

Feature 4

Each of the two hooks comprises an L-shaped member with a first portion and a second portion, the first portion extending generally perpendicular from the first region, the second portion extending generally perpendicular from the first portion, the second portion sized and shaped to be inserted into a perforation in the perforated support panel.

Feature 5

The means for preventing tilting of the slatwall accessory downwardly from a generally horizontal plane comprises a flange terminating the second region and being configured to abut the surface of the perforated support panel during use of the article of manufacture.

Feature 6

The flange comprises a first flange portion extending generally perpendicular to the plane of the second region and a second flange portion extending from the first flange portion in a direction of the two hooks.

Feature 7

The flange is inclined relative to a plane of the second region or inclined to the plane of the body.

Feature 8

The body comprises:

a planar first region;

a planar second region extending from the first region in a vertical direction, during use of the article of manufacture, a plane of the second region being offset from a plane of the first region;

a third region extending from the second region, a plane of the third region being offset from the plane of the second region in a direction of the first region; and the second region and the third region defining the portion of the body being disposed at a distance from the surface of the non-slatwall member.

Feature 9

One or more elongated apertures comprises two elongated apertures spaced apart from each other in the vertical direction during use of the article of manufacture, one of the two elongated apertures being formed through a thickness of the first region, another one of the two elongated apertures being formed through a thickness of the third region, each of the two elongated apertures being sized and shaped to receive an offset portion of the slatwall accessory therethrough.

Feature 10

The non-slatwall member is a perforated support panel, the means for attaching the article of manufacture to the non-slatwall member comprises two hooks disposed on one edge of the first region, each of the two hooks is configured to attach the article of manufacture to the perforated support panel and suspend the article of manufacture therefrom.

Feature 11

The means for preventing tilting of the slatwall accessory downwardly from a generally horizontal plane comprises a planar fourth region extending from the third region, a plane of the fourth region being offset from the plane of the third region in the direction of the first region, the fourth region comprising a one or more apertures.

Feature 12

One or more elongated apertures comprises a plurality of elongated apertures spaced apart with each other along a length of the article of manufacture.

Feature 13

One or more elongated apertures comprises:

a first plurality of elongated apertures spaced apart with each other along a length of the article of manufacture;

a second plurality of elongated apertures spaced apart with each other along the length of the article of manufacture;

the second plurality of elongated apertures is spaced apart, in a vertical direction during use of the apparatus, from the first plurality of elongated apertures; and.

each elongated aperture from the first plurality of elongated apertures is aligned with a respective elongated aperture from the second plurality of elongated apertures.

Feature 14

One or more elongated apertures comprises an elongated aperture sized to receive therethrough two or more offset portions, each offset portion from the two or more offset portions belongs to a distinct support in the slatwall accessory.

Feature 15

The means for attaching the article of manufacture to the non-slatwall member comprises two or more hooks, spaced apart from each other along a length of the article of manufacture.

Feature 16

The means for attaching the article of manufacture to the non-slatwall member comprises two or more apertures formed through a thickness of the body and being spaced apart from each other along a length of the article of manufacture.

Feature 17

The means for preventing tilting of the slatwall accessory comprises at least one aperture and at least one fastener, the at least one fastener passed through the at least one aperture and through a perforation in the non-slatwall member, the perforation being aligned with the at least one aperture.

Feature 18

The portion of the body is being configure to abut a portion of the slatwall accessory.

Feature 19

Accessory is attached or coupled to the article of manufacture.

Feature 20

The first region comprises a pair of surfaces spaced apart from each other to define a thickness of the first region, the elongated aperture being formed through the thickness.

Feature 21

The second region comprises a pair of surfaces spaced apart from each other to define a thickness of the second region.

Feature 22

The perforated support panel can be a perforated support panel, a perfboard, a tempered hardboard, or a plastic perforated support panel.

Feature 23

The perforated support panel being affixed to a vertical wall.

Feature 23

The perforated support panel defines a rail with a working portion and a pair of mounting portions.

Feature 24

The rail also comprises perforations to affix the rail to a surface and to attach or couple the adapter onto the working portion.

Feature 25

The perforated support panel configured as a free-standing member and comprises a perforated component adapted with perforations and being fastened with fasteners to a pair of uprights, each shown as being supported on a support Feature 26

The support can be optionally mobile by a pair of wheels.

Feature 27

The perforated support panel does not have to have perforations incorporated throughout an entire area thereof, i.e., the perforated support panel may have portion or portions thereof with perforations and portion or portions thereof without perforations.

The chosen exemplary embodiments of the claimed subject matter have been described and illustrated, to plan and/or cross section illustrations that are schematic illustrations of idealized embodiments, for practical purposes so as to enable any person skilled in the art to which it pertains to make and use the same. As such, variations from the shapes of the illustrations as a result, for example, of manufacturing techniques and/or tolerances, are to be expected. It is therefore intended that all matters in the foregoing description and shown in the accompanying drawings be interpreted as illustrative and not in a limiting sense. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. It will be understood that variations, modifications, equivalents and substitutions for components of the specifically described exemplary embodiments of the invention may be made by those skilled in the art without departing from the spirit and scope of the invention as set forth in the appended claims.

When used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

Any element in a claim at does not explicitly state "means for" performing a specified function, or "step for" performing a specified function, is not to be interpreted as a "means" or "step" clause as specified in 35 U.S.C. § 112, ¶6. In particular, any use of "step of" in the claims not intended to invoke the provision of 35 U.S.C. § 112, ¶6.

Anywhere the term "comprising" is used, embodiments and components "consisting essentially of" and "consisting of" are "expressly disclosed and described herein."

Furthermore, the Abstract is not intended to be limiting as to the scope of the claimed invention and is for the purpose of quickly determining the nature of the claimed invention.

What is claim is:

1. An article of manufacture for attaching a slatwall accessory with an offset portion to a non-slatwall member, comprising:
  a body comprising a portion being disposed at a distance from a surface of the non-slatwall member during use of said article of manufacture, said body further comprising a first planar region, and a second planar region extending from said first planar region in a vertical direction during said use of said article of manufacture, a plane of said second planar region being offset from a plane of said first planar region, said second planar region defining said portion of said body being disposed at said distance from the surface of the non-slatwall member, said first planar region being disposed at a smaller distance from the surface of the non-slatwall member;
  means for attaching said article of manufacture to the non-slatwall member;
  one or more elongated apertures formed through a thickness of said first planar region and disposed in a horizontal direction during use of said article of manufacture, each of said one or more elongated apertures being sized and shaped to receive the offset portion of the slatwall accessory therethrough; and
  means for preventing tilting of the slatwall accessory downwardly from a generally horizontal plane when the slatwall accessory is attached or coupled to said article of manufacture.

2. The article of manufacture of claim 1, wherein the non-slatwall member is a perforated support panel, said means for attaching said article of manufacture to the non-slatwall member comprises two hooks disposed on one edge of said first planar region, each of said two hooks is configured to attach said article of manufacture to the perforated support panel and suspend said article of manufacture therefrom.

3. The article of manufacture of claim 2, wherein said each of said two hooks comprises an L-shaped member with a first portion and a second portion, said first portion extending generally perpendicular from said first planar region, said second portion extending generally perpendicular from said first portion, said second portion sized and shaped to be inserted into a perforation in the perforated support panel.

4. The article of manufacture of claim 1, wherein said means for preventing tilting of the slatwall accessory downwardly from a generally horizontal plane comprises a flange terminating said second planar region and being configured to abut the surface of the non-slatwall member during said use of said article of manufacture.

5. The article of manufacture of claim 4, wherein said flange comprises a first flange portion extending generally perpendicular to said plane of said second planar region and a second flange portion extending from said first flange portion in a direction of said two hooks.

6. The article of manufacture of claim 1, wherein said body comprises: a third region extending from said second planar region, a plane of said third region being offset from said plane of said second planar region in a direction toward said first planar region.

7. The article of manufacture of claim 6, wherein said one or more elongated apertures comprises one elongated aperture through said thickness of said first planar region and wherein said article of manufacture further comprises another elongated aperture formed through a thickness of said third region and being spaced apart from said elongated aperture through said thickness of said first planar region in said vertical direction during said use of said article of manufacture, said another elongated aperture being sized and shaped to receive another offset portion of the slatwall accessory therethrough.

8. The article of manufacture of claim 6, wherein the non-slatwall member is a pegboard with a grid of apertures, said means for attaching said article of manufacture to the non-slatwall member comprises two hooks disposed on one edge of said first planar region, each of said two hooks is configured to pass through an aperture in the pegboard so as to attach said article of manufacture to the pegboard and suspend said article of manufacture therefrom.

9. The article of manufacture of claim 6, wherein said means for preventing tilting of the slatwall accessory downwardly from a generally horizontal plane comprises a fourth region extending from said third region, a plane of said fourth region being offset from said plane of said third region in said direction toward said first planar region, said fourth region comprising one or more apertures formed through a thickness thereof.

10. The article of manufacture of claim 1, wherein said one or more elongated apertures comprises a plurality of elongated apertures spaced apart with each other along a length of said article of manufacture.

11. The article of manufacture of claim 6, wherein said one or more elongated apertures comprises a first plurality of elongated apertures spaced apart with each other along a length of said article of manufacture; and
  wherein said article of manufacture further comprises a second plurality of elongated apertures formed through a thickness of said third region and being spaced apart with each other along said length of said article of manufacture;
  said second plurality of elongated apertures is spaced apart, in a vertical direction during said use of said article of manufacture, from said first plurality of elongated apertures; and
  each elongated aperture from said first plurality of elongated apertures is aligned in said vertical direction with a respective elongated aperture from said second plurality of elongated apertures.

12. The article of manufacture of claim 1, wherein said one or more elongated apertures comprises an elongated aperture sized to receive therethrough two or more offset portions, each offset portion from said two or more offset portions belongs to a distinct support in the slatwall accessory.

13. The article of manufacture of claim 1, wherein said means for attaching said article of manufacture to the non-slatwall member comprises two or more hooks, spaced apart from each other along a length of said article of manufacture.

14. The article of manufacture of claim 1, wherein said means for attaching said article of manufacture to the non-slatwall member comprises two or more additional apertures formed through a thickness of said first planar region and being spaced apart from each other along a length of said article of manufacture.

15. The article of manufacture of claim 14, wherein two additional apertures from said two or more additional apertures are being formed through said thickness of said first region.

16. The article of manufacture of claim 15, further comprising:
a third region extending from said second region, a plane of said third region being offset from said plane of said second region in a direction of said first region; and
a fourth region, extending from said planar third region, a plane of said fourth region being offset from said plane of said third region in said direction of said planar first region;
wherein another two additional apertures from said two or more additional apertures are being formed through a thickness of said fourth region.

17. The article of manufacture of claim 1, wherein said means for preventing tilting of the slatwall accessory comprises at least one aperture and at least one fastener, said at least one fastener passed though said at least one aperture and through a perforation in the non-slatwall member, said perforation being aligned with said at least one aperture.

18. The article of manufacture of claim 1, wherein said portion is being configured to abut a portion of the slatwall accessory during said use of said article of manufacture.

19. An article of manufacture for attaching a slatwall accessory with an offset portion to a pegboard with a grid of apertures, comprising:
a planar first region;
a plurality of elongated apertures being formed through a thickness of said planar first region and being disposed in a horizontal direction during use of said article of manufacture, each of said plurality of said elongated apertures being sized and shaped to receive the offset portion of the slatwall accessory therethrough;
two or more hooks disposed on one edge of said planar first region, each of said two or more hooks is being configured to pass through an aperture in the pegboard so as to attach said article of manufacture to the pegboard and suspend said article of manufacture therefrom;
a planar second region extending from said planar first region in a vertical direction, during said use of said article of manufacture, opposite to a direction of said two or more hooks, a plane of said planar second region being offset from a plane of said planar first region in a direction away from the pegboard during said use of said article of manufacture; and
a flange terminating said planar second region and being configured to abut a surface of the pegboard during said use of said article of manufacture.

20. An article of manufacture for attaching a slatwall accessory with an offset portion to a pegboard with a grid of apertures, comprising:
a planar first region;
a first plurality of elongated apertures being formed through a thickness of said planar first region and being disposed in series with each other along a length of said article of manufacture and in a horizontal direction during use of said article of manufacture, each of said first plurality of said elongated apertures being sized and shaped to receive the offset portion of the slatwall accessory therethrough;
two or more hooks disposed on one edge of said first region, each of said two or more hooks is being configured to pass through an aperture in the pegboard so as to attach said article of manufacture to the pegboard and suspend said article of manufacture therefrom;
a planar second region extending from said planar first region in a vertical direction, during said use of said article of manufacture, opposite to a direction of said two hooks, a plane of said planar second region being offset from a plane of said planar first region in a direction away from the pegboard during said use of said article of manufacture;
a planar third region extending from said second region, a plane of said third region being offset from said plane of said planar second region in a direction of said planar first region,
a second plurality of elongated apertures being formed through a thickness of said planar third region and being disposed in series with each other along a length of said article of manufacture and in said horizontal direction during said use of said article of manufacture, each of said second plurality of said elongated apertures being sized and shaped to receive another offset portion of the slatwall accessory therethrough; and
a planar fourth region, extending from said planar third region, a plane of said planar fourth region being offset from said plane of said planar third region in said direction of said planar first region, said fourth region comprising one or more apertures.

* * * * *